H. E. WELCHEL AND A. A. McCRAY.
ELECTRIC HEATER.
APPLICATION FILED JULY 12, 1920.

1,361,556.

Patented Dec. 7, 1920.
2 SHEETS—SHEET 1.

INVENTORS.
HERBERT E. WELCHEL
AARON A. McCRAY.
BY
Lockwood Lockwood
ATTORNEYS.

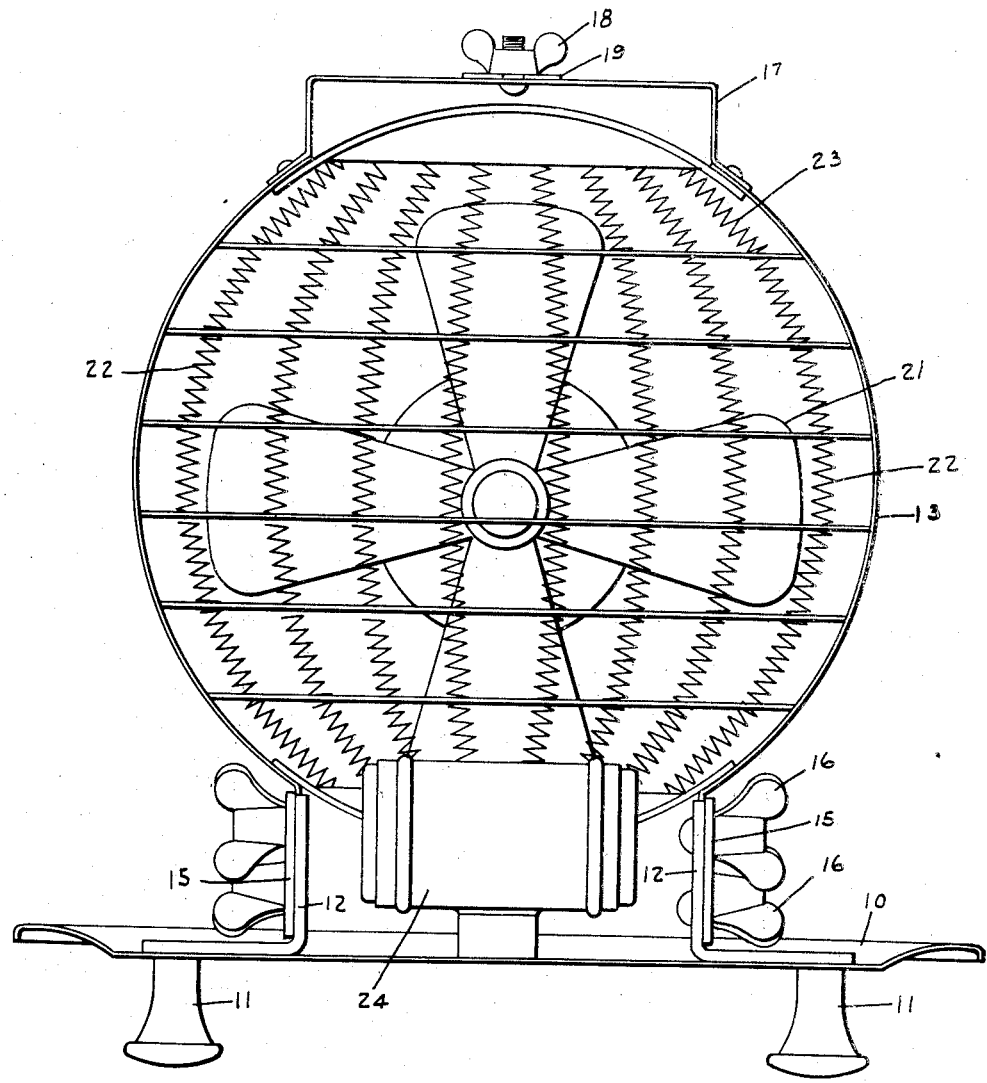

UNITED STATES PATENT OFFICE.

HERBERT E. WELCHEL AND AARON A. McCRAY, OF INDIANAPOLIS, INDIANA.

ELECTRIC HEATER.

1,361,556.     Specification of Letters Patent.     Patented Dec. 7, 1920.

Application filed July 12, 1920. Serial No. 395,734.

*To all whom it may concern:*

Be it known that we, HERBERT E. WELCHEL and AARON A. McCRAY, citizens of the United States, and residents of Indianapolis, county of Marion, and State of Indiana, have invented a certain new and useful Electric Heater; and we do hereby declare that the following is a full, clear, and exact description thereof, reference being had to the accompanying drawings, in which like numerals refer to like parts.

This invention relates to the electrical art and in particular to electric heaters.

The chief object of this invention is to construct an electric heater which may be secured in a plurality of adjusted positions, whereby said heater may be used for various purposes, such as for drying hair, heating a room, or cooking and the like.

The chief feature of the invention consists in associating with the electric heater a supporting tray and supporting means by which the heater is positioned upon the tray in one or more adjusted positions.

A further feature of the invention consists in positioning the heater with respect to a supporting tray such that the same is hinged thereto and when swung upwardly above the tray from a horizontal position, the space formerly occupied by said heater may be occupied by a blower fan.

The full nature of this invention will be understood from the accompanying drawings and the following description and claims.

Figure 1:
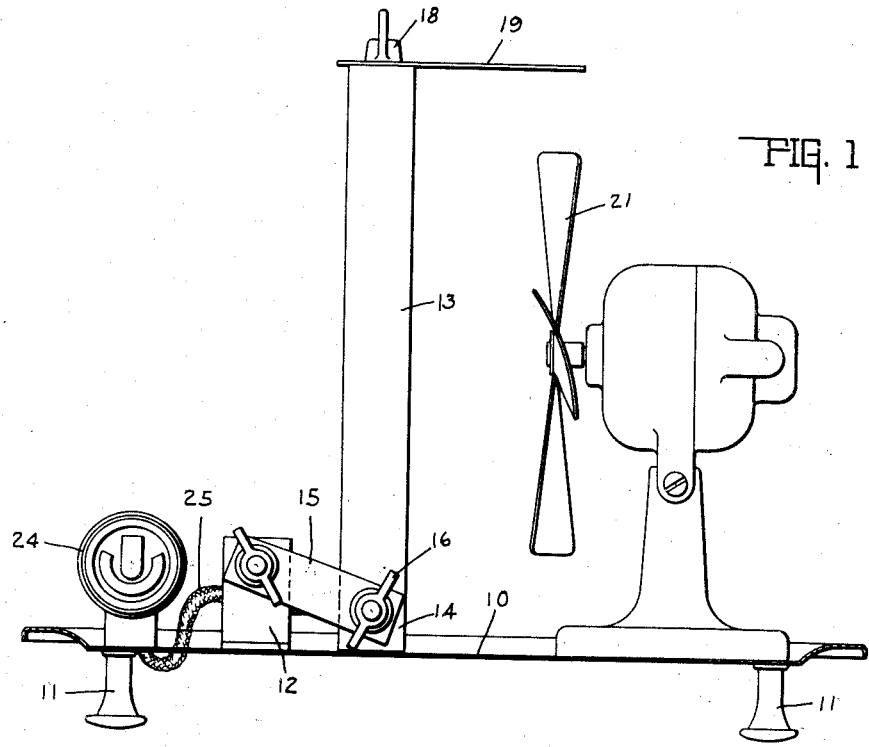
Figure 2:
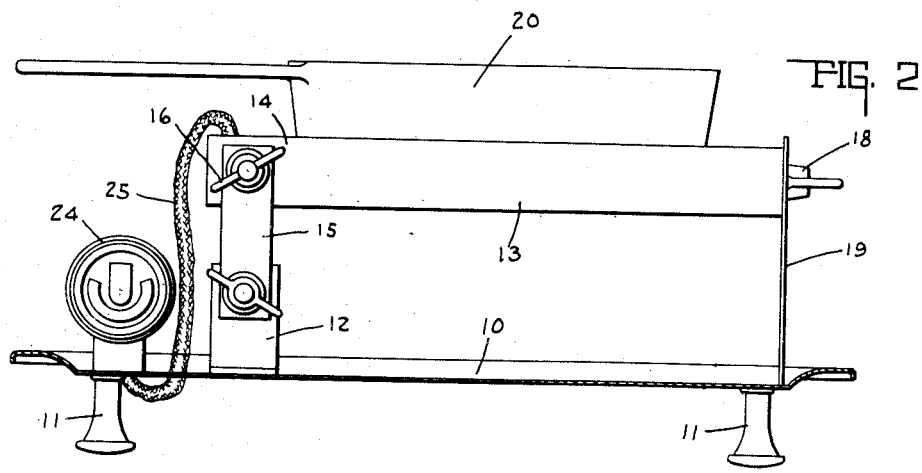

Figure 1 is a side elevational view of the invention showing the same used as a hair drier or electric heater for heating purposes. Fig. 2 is a side elevational view of the invention showing the same in another position and when used for cooking purposes. Fig. 3 is an elevational view of the combination showing the parts used for heating purposes.

The invention consists of a supporting tray 10 provided with supporting legs or pedestals 11. Adjacent one edge of the tray is provided a pair of spaced angle or L-shaped brackets 12, one end being secured to the tray and the other end projecting upwardly therefrom. A heating element 13 is provided with a supporting portion 14 at one end thereof and to the same and to the brackets 12 are secured a pair of links 15, said links being secured thereto by suitable wing nuts 16.

Upon the other end of the heater 13 is secured a supporting bracket 17 and to the same is secured, by means of the wing nut 18, a projecting leg 19, said projecting leg preferably having a pin and slot connection with the supporting bracket 17. Fig. 2 illustrates the heater 13 when used for cooking purposes, in this instance the links 15 extending upwardly over the brackets 12 and are rigidly secured to the end portion 14 of the heater so that said heater is positioned substantially parallel with the tray 10. The other end of the heater is supported by the leg 19 such that the pan 20 upon the heater 13 may be substantially horizontal.

When the heater is positioned as shown in Fig. 1 the tray 10, instead of serving as a catch basin for the cooking element, now serves as a support for an electrically driven fan 21, said fan projecting or throwing the air through the interstices 22 of the heating element, said air when passing through said interstices being heated by the coils 23.

Positioned adjacent the heater supporting hinge is a duplex circuit outlet or socket 24, one end of which is adapted to receive a fan, circuit plug, not shown, and the other is adapted to receive the plug connecting said duplex socket with a source of electrical supply. The circuit wire 25 is suitably connected to the duplex socket such that the heating element is always connected to said socket and receives energy through the same. It will be thus understood that there is provided a combination heating element wherein the heater may be used for heating purposes or may be used for cooking purposes or for other purposes, and wherein the tray portion supporting said heater may be used for a catch basin to catch crumbs and the like when said heater is used as a toaster, or said tray also serves as a reflector reflecting the heat from the heater upwardly through the same to protect the table or surface upon which said tray is placed.

While but two positions have been illustrated in the drawings, it will be understood that said heater element may be otherwise positioned intermediate said positions when it is desired to position said heating element at an angle other than the vertical or horizontal position. While the invention has been described in considerable detail it will be understood that many modifications thereof will readily suggest themselves to those skilled in the art, but the broad invention is the idea of adjustably supporting the heating element upon a supporting base such that said base and heating element may have varied relations with each other.

The invention claimed is:

1. An electric heater construction including a supporting base, an electric heating element, a bracket leg upon one end of said element for supporting the same in spaced relation with said base, and additional supporting means for supporting the other end of said heater in spaced relation with said base.

2. An electric heater construction including a supporting base, an electric heater element, a bracket on one end of said heater element, pin and slot means associating said bracket with said heater element for securing the same in adjusted relation with said base, and hinge means supporting the other end of said heater element upon said base in adjusted relation therewith.

3. An electric heater construction including a supporting tray, a heater element hinged at one end near one end of the tray, said heater element being movable upwardly from a horizontal position whereby said tray is adapted to support a blower fan in adjusted position to said heater element for heating purposes.

4. An electric heater construction including a supporting tray, a heater element provided at one end with a supporting projection, a pair of brackets in spaced relation with said projection, and a pair of links each having one end attached to one of said brackets and the other end attached to one end of the supporting projection for hingedly supporting said heater element upon said base.

5. An electric heater construction including in combination a supporting tray, a distributing circuit device, electric heater element, means hingedly supporting said heater element upon said tray, and a fan adapted to be supported upon said tray adjacent said heater element, said fan and said heater element being supplied with energy from said distributing device.

In witness whereof we have hereunto affixed our signatures.

HERBERT E. WELCHEL.
AARON A. McCRAY.